US012777207B2

(12) United States Patent
Hanks

(10) Patent No.: US 12,777,207 B2
(45) Date of Patent: Oct. 27, 2026

(54) SYSTEM FOR PACKETCABLE VERSION MANAGEMENT

(71) Applicant: ARRIS Enterprises LLC, Horsham, PA (US)

(72) Inventor: William T. Hanks, Carol Stream, IL (US)

(73) Assignee: ARRIS Enterprises LLC, Horsham, PA (US)

( * ) Notice: Subject to any disclaimer, the term of this patent is extended or adjusted under 35 U.S.C. 154(b) by 22 days.

(21) Appl. No.: 19/114,361

(22) PCT Filed: Sep. 22, 2023

(86) PCT No.: PCT/US2023/033550
§ 371 (c)(1),
(2) Date: Mar. 21, 2025

(87) PCT Pub. No.: WO2024/064389
PCT Pub. Date: Mar. 28, 2024

(65) Prior Publication Data
US 2026/0101072 A1 Apr. 9, 2026

Related U.S. Application Data

(60) Provisional application No. 63/409,559, filed on Sep. 23, 2022.

(51) Int. Cl.
*H04N 21/238* (2011.01)
*H04N 21/222* (2011.01)
*H04N 21/61* (2011.01)

(52) U.S. Cl.
CPC ....... *H04N 21/238* (2013.01); *H04N 21/2221* (2013.01); *H04N 21/6118* (2013.01)

(58) Field of Classification Search
CPC ....................... H04N 21/2221; H04N 21/6118
See application file for complete search history.

(56) References Cited

U.S. PATENT DOCUMENTS 9,871,687 B2 * 1/2018 Abramson ......... H04N 21/4263
10,110,973 B2 * 10/2018 Adams .................. G06F 40/226
2004/0107356 A1 * 6/2004 Shamoon ........... H04N 21/4405 375/E7.009
2005/0249196 A1 * 11/2005 Ansari ................ H04L 12/2803 370/352
2006/0149845 A1 * 7/2006 Malin ..................... H04L 67/61 709/228
2010/0312892 A1 * 12/2010 Woundy ............. H04L 41/5022 709/230

(Continued)

FOREIGN PATENT DOCUMENTS

EP 3211889 A1 8/2017

OTHER PUBLICATIONS

CableLabs, Data-Over-Cable Service Interface Specifications Flexible MAC Architecture FMA PacketCable™ Aggregator Interface Specification CM-SP-FMA-PAI-I01-200930, 2020, p. 1-22. (Year: 2020).*

(Continued)

*Primary Examiner* — Hieu T Hoang
(74) *Attorney, Agent, or Firm* — Chernoff, Vilhauer, McClung & Stenzel, LLP

(57) ABSTRACT

A system for managing PacketCable versions.

13 Claims, 7 Drawing Sheets

Supported Protocol Versions

| MAC NE # | 1 | 2 | 3 | 4 | 5 | 6 | 7 |
|---|---|---|---|---|---|---|---|
| 1 | ✓ | ✓ | ✓ | ✓ | | ✓ | ✓ |
| 2 | ✓ | ✓ | ✓ | ✓ | | | ✓ |
| 3 | ✓ | ✓ | ✓ | ✓ | | | |
| 4 | ✓ | ✓ | ✓ | ✓ | ✓ | | ✓ |
| 5 | ✓ | ✓ | ✓ | ✓ | ✓ | | |

(56) References Cited

U.S. PATENT DOCUMENTS

| | | | | |
|---|---|---|---|---|
| 2013/0238770 | A1* | 9/2013 | Hajduczenia | H04L 41/0803 709/220 |
| 2019/0052707 | A1* | 2/2019 | Wikoff | H04L 65/1104 |
| 2022/0239724 | A1 | 7/2022 | Rudolph et al. | |

OTHER PUBLICATIONS

International Search Report and Written Opinion RE: Application No. PCT/US23/033550, dated Dec. 13, 2023.

Anonymous: "Data-Over-Cable Service Interface Specifications (DCA)", Internet Citation, Sep. 8, 2015 (Sep. 8, 2015), pp. 1-44, XP009522794, Retrieved from the Internet: URL:https://www.cablelabs.com/specifications/CM-TR-DCA-V01-150908 the whole document paragraph [0009].

* cited by examiner

Supported Protocol Versions

| MAC NE # | 1 | 2 | 3 | 4 | 5 | 6 | 7 |
|---|---|---|---|---|---|---|---|
| 1 | ✓ | ✓ | ✓ | ✓ | | ✓ | ✓ |
| 2 | ✓ | ✓ | ✓ | ✓ | | | ✓ |
| 3 | ✓ | ✓ | ✓ | ✓ | | | |
| 4 | ✓ | ✓ | ✓ | ✓ | ✓ | | ✓ |
| 5 | ✓ | ✓ | ✓ | ✓ | ✓ | | |

SYSTEM FOR PACKETCABLE VERSION MANAGEMENT

CROSS REFERENCE TO RELATED APPLICATIONS

The present application claims priority to U.S. Provisional App. No. 63/409,559 filed Sep. 23, 2022, the contents of which are incorporated herein by reference in their entirety.

BACKGROUND

The subject matter of this application relates to PacketCable version management.

Cable Television (CATV) services provide content to large groups of customers (e.g., subscribers) from a central delivery unit, generally referred to as a "head end," which distributes channels of content to its customers from this central delivery unit through an access network comprising a hybrid fiber coax (HFC) cable plant, including associated components (nodes, amplifiers and taps). Modern Cable Television (CATV) service networks, however, not only provide media content such as television channels and music channels to a customer, but also provide a host of digital communication services such as Internet Service, Video-on-Demand, telephone service such as VoIP, home automation/security, and so forth. These digital communication services, in turn, require not only communication in a downstream direction from the head end, through the HFC, typically forming a branch network and to a customer, but also require communication in an upstream direction from a customer to the head end typically through the HFC network.

To this end, CATV head ends have historically included a separate Cable Modem Termination System (CMTS), used to provide high speed data services, such as cable Internet, Voice over Internet Protocol, etc. to cable customers and a video headend system, used to provide video services, such as broadcast video and video on demand (VOD). Typically, a CMTS will include both Ethernet interfaces (or other more traditional high-speed data interfaces) as well as radio frequency (RF) interfaces so that traffic coming from the Internet can be routed (or bridged) through the Ethernet interface, through the CMTS, and then onto the RF interfaces that are connected to the cable company's hybrid fiber coax (HFC) system. Downstream traffic is delivered from the CMTS to a cable modem and/or set top box in a customer's home, while upstream traffic is delivered from a cable modem and/or set top box in a customer's home to the CMTS. The Video Headend System similarly provides video to either a set-top, TV with a video decryption card, or other device capable of demodulating and decrypting the incoming encrypted video services. Many modern CATV systems have combined the functionality of the CMTS with the video delivery system (e.g., EdgeQAM—quadrature amplitude modulation) in a single platform generally referred to an Integrated CMTS (e.g., Integrated Converged Cable Access Platform (CCAP))—video services are prepared and provided to the I-CCAP which then QAM modulates the video onto the appropriate frequencies. Still other modern CATV systems generally referred to as distributed CMTS (e.g., distributed Converged Cable Access Platform) may include a Remote PHY (or R-PHY) which relocates the physical layer (PHY) of a traditional Integrated CCAP by pushing it to the network's fiber nodes (R-MACPHY relocates both the MAC and the PHY to the network's nodes). CableLabs specifications refer to this architecture as a Distributed Access Architecture (DAA) with Flexible MAC Architecture (FMA). Thus, while the core in the CCAP performs the higher layer processing, the R-PHY device in the remote node converts the downstream data sent from the core from digital-to-analog to be transmitted on radio frequency to the cable modems and/or set top boxes, and converts the upstream radio frequency data sent from the cable modems and/or set top boxes from analog-to-digital format to be transmitted optically to the core.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
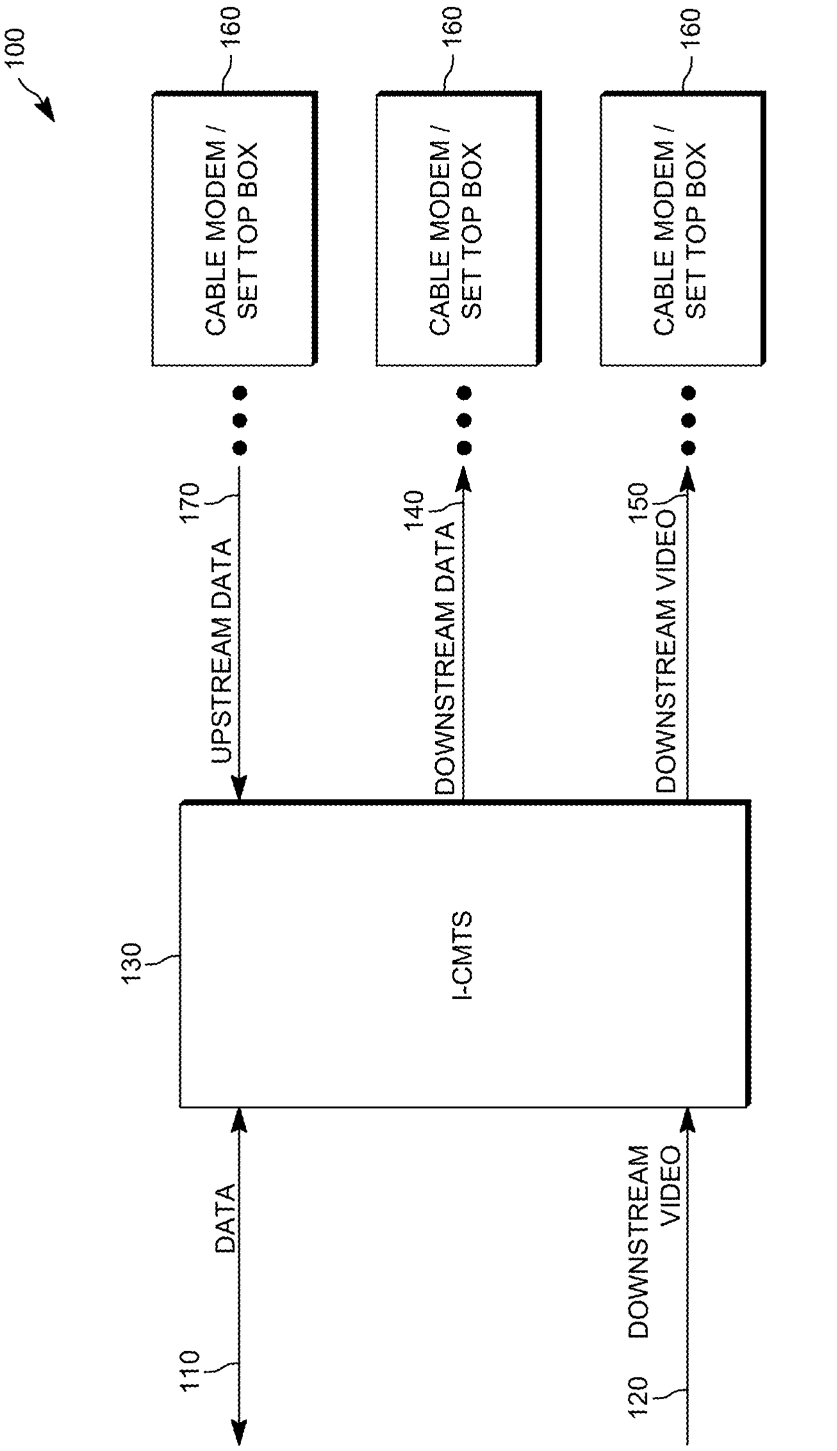
FIG. 1 illustrates an integrated Cable Modem Termination System.

Referring to FIG. 1, an integrated CMTS (e.g., Integrated Converged Cable Access Platform (CCAP)) 100 may include data 110 that is sent and received over the Internet (or other network) typically in the form of packetized data. The integrated CMTS 100 may also receive downstream video 120, typically in the form of packetized data from an operator video aggregation system. By way of example, broadcast video is typically obtained from a satellite delivery system and pre-processed for delivery to the subscriber though the CCAP or video headend system. The integrated CMTS 100 receives and processes the received data 110 and downstream video 120. The CMTS 130 may transmit downstream data 140 and downstream video 150 to a customer's cable modem and/or set top box 160 through a RF distribution network, which may include other devices, such as amplifiers and splitters. The CMTS 130 may receive upstream data 170 from a customer's cable modem and/or set top box160 through a network, which may include other devices, such as amplifiers and splitters. The CMTS 130 may include multiple devices to achieve its desired capabilities.

Figure 2A:
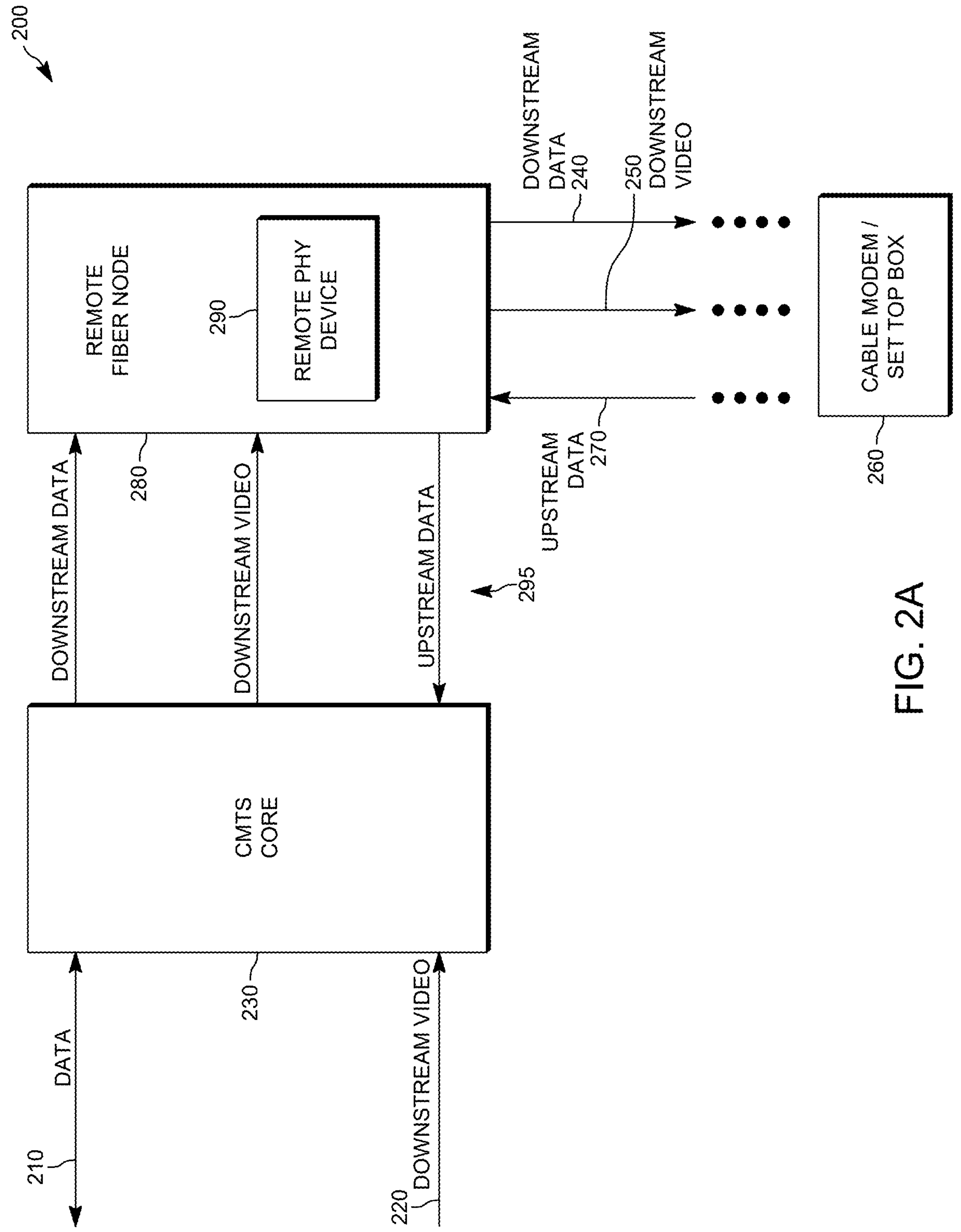
FIGS. 2A-2B illustrates distributed Cable Modem Termination Systems.

Referring to FIG. 2A, as a result of increasing bandwidth demands, limited facility space for integrated CMTSs, and power consumption considerations, a Distributed Cable Modem Termination System (D-CMTS) 200 (e.g., Distributed Converged Cable Access Platform (CCAP)) may be used. CableLabs specifications refer to this architecture as a Distributed CCAP Architecture (DCA) in the Flexible MAC Architecture (FMA) specifications. In general, the CMTS is focused on data services while the CCAP further includes broadcast video services. The D-CMTS 200 distributes a portion of the functionality of the I-CMTS 100 downstream to a remote location, such as a fiber node, using network packetized data. An exemplary D-CMTS 200 may include a remote PHY architecture, where a remote PHY (R-PHY) is preferably an optical node device that is located at the junction of the fiber and the coaxial. In general, the R-PHY often includes the PHY layers of a portion of the system. The D-CMTS 200 may include a D-CMTS 230 (e.g., core) that includes data 210 that is sent and received over the Internet (or other network) typically in the form of packetized data. The D-CMTS 230 is referred to as the Remote MAC Core (RMC) in the Flexible MAC Architecture (FMA) CableLabs specifications. The D-CMTS 200 may also receive downstream video 220, typically in the form of packetized data from an operator video aggregation system. The D-CMTS 230 receives and processes the received data 210 and downstream video 220. A remote fiber node 280 preferably include a remote PHY device (RPD) 290. The RPD 290 may transmit downstream data 240 and downstream video 250 to a customer's cable modem and/or set top box 260 through a network, which may include other devices, such as amplifier and splitters. The RPD 290 may receive upstream data 270 from a customer's cable modem and/or set top box 260 through a network, which may include other devices, such as amplifiers and splitters. The RPD 290 may include multiple devices to achieve its desired capabilities. The RPD 290 primarily includes PHY related circuitry, such as downstream QAM modulators, upstream QAM demodulators, together with psuedowire logic to connect to the D-CMTS 230 using network packetized data. The RPD 290 and the D-CMTS 230 may include data and/or video interconnections, such as downstream data, downstream video, and upstream data 295. It is noted that, in some embodiments, video traffic may go directly to the RPD thereby bypassing the D-CMTS 230. In some cases, the remote PHY and/or remote MACPHY functionality may be provided at the head end.

Figure 2B:
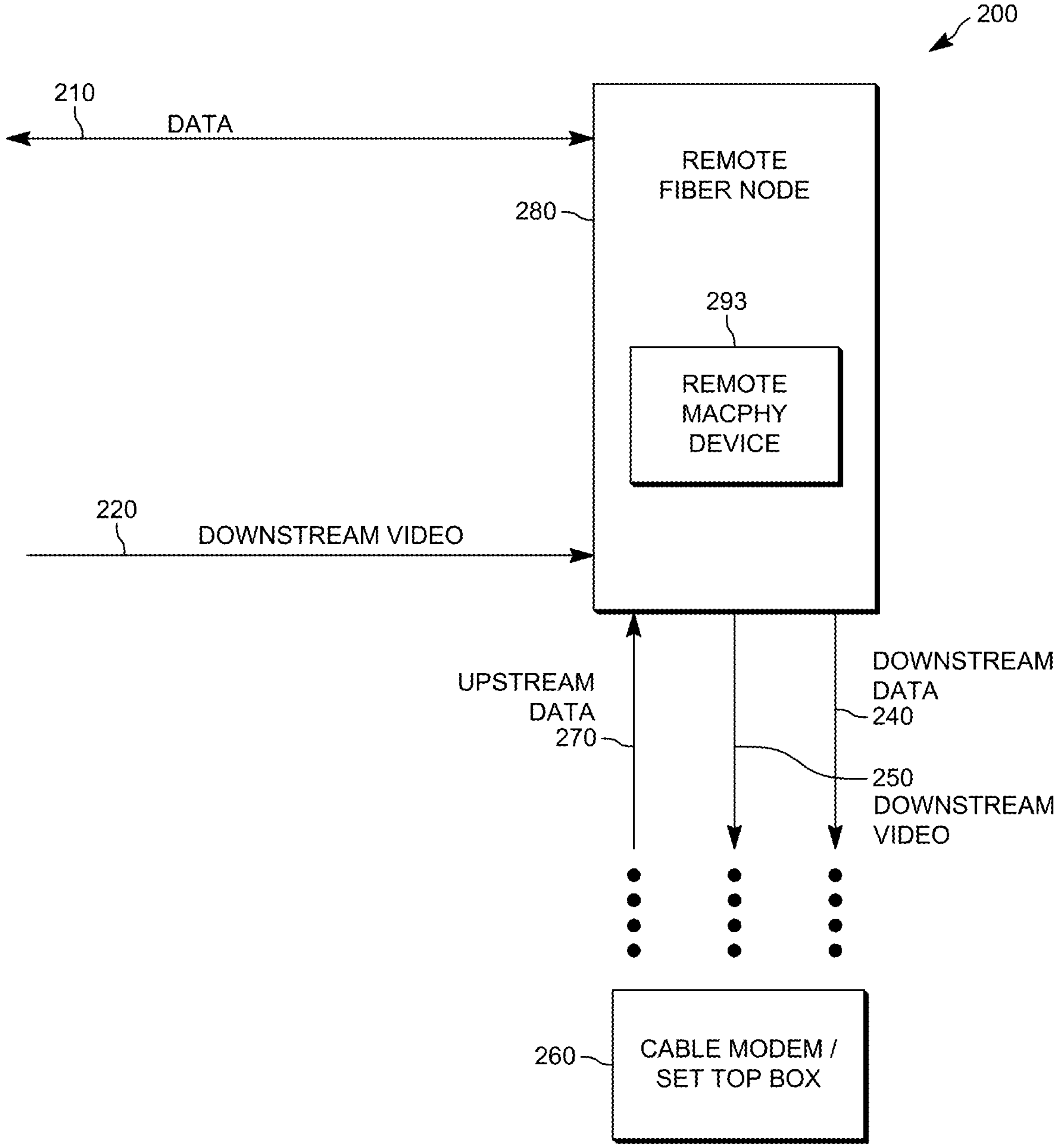

Referring to FIG. 2B, a modified distributed architecture includes a remote MACPHY device (RMD) 293 included within the remote fiber node 280.

By way of example, the RPD 290 may covert downstream DOCSIS (i.e., Data Over Cable Service Interface Specification) data (e.g., DOCSIS 1.0; 1.1; 2.0; 3.0; 3.1; and 4.0 each of which are incorporated herein by reference in their entirety), video data, out of band signals received from the D-CMTS 230 to analog for transmission over RF or analog optics. By way of example, the RPD 290 may convert upstream DOCSIS, and out of band signals received from an analog medium, such as RF or linear optics, to digital for transmission to the D-CMTS 230. As it may be observed, depending on the particular configuration, the R-PHY may move all or a portion of the DOCSIS MAC and/or PHY layers down to the fiber node.

The amount of data services supported by DOCSIS based networks over time has been increasing. To support the ever-increasing data capacity needs, the DOCSIS standard has likewise been evolving in a manner to support the increasing data capacity needs. A single-carrier quadrature amplitude modulation (SC-QAM) based transmission of DOCSIS 3.0 is giving way to orthogonal frequency division multiplexing (OFDM) and orthogonal frequency division multiple access (OFDMA) of DOCSIS 3.1, to support greater megabits per second (Mbps) per mega-hertz (MHz) of spectrum. Furthermore, more MHz of radio frequency (RF) spectrum yields more Mbps, thus a wider spectrum, for both downstream (DS) and upstream (US) transmission is another manner in which the DOCSIS standard has evolved. For example, the DOCSIS standard has evolved from (1) 5-85 MHz US with 102-1002 MHz DS supported by DOCSIS 3.0 to (2) 5-204 MHz US with 258-1218 MHz DS of DOCSIS 3.1, and (3) 5-682 MHz US with 108-1794 MHz DS of DOCSIS 4.0. Transmitted spectrum width increase, in DS especially, affects how the network is architected. The DOCSIS 3.1 to DOCSIS 4.0 transition, from 1,218 MHz highest DS frequency to 1,794 MHz highest DS frequency, envisions a change from a centralized access architecture (CAA) to distributed access architecture (DAA), in order to support higher OFDM modulation formats and thus improved spectral density at the DAA nodes.

In general, the application manager manages an application that uses enhanced quality of service, typically by way of setting up the enhanced quality of service signaling for the application. By way of example, telephone, gaming, and/or video may use an enhanced quality of service. In general, the policy server may arbitrate among multiple application managers, where each of the application managers requests an enhanced quality of service.

Figure 3:
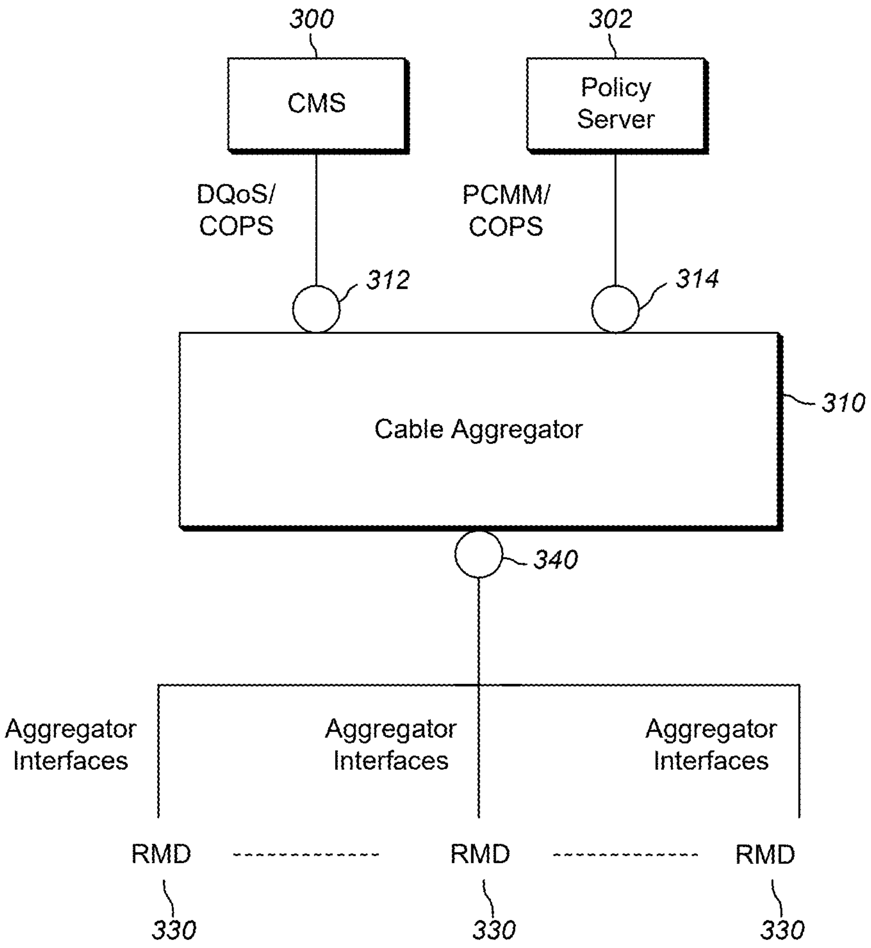
FIG. 3 illustrates a framework for deploying protocols for a distributed access architecture.

Referring to FIG. 3, a framework may be used to efficiently deploy both remote PHY (R-PHY) and remote MACPY (R-MACPHY), generally referred to as distributed access architecture. The distributed access architecture provides the PHY capabilities of a legacy integrated CCAP. The framework may include a call management server (CMS) 300 and a policy server 302, all of which are interconnected to a cable aggregator 310 using a set of cable interfaces 312 and 314. The cable interfaces 312, 314 preferably use a common open policy service protocol. See, IETF RFC 2748, The COPS (Common Open Policy Service) Protocol, January 2000, incorporated by reference herein. By way of example, the interface with the CMS 300 may include PacketCable Dynamic Quality of Service (DQoS) over COPS. See, PacketCable Dynamic Quality-of-Service Specification PKT-SP-DQOS-I12-050812, Aug. 12, 2005, incorporated by reference herein. By way of example, the interface with the Policy Server 302 may include PacketCable Multimedia (PCMM) over COPS. See, PacketCable Specification Multimedia Specification PKT-SP-MM-I07-151111, Nov. 11, 2005, incorporated by reference herein. The cable aggregator 310 (which may include a MAC manager, if desired) provides the appearance to existing back-office systems and applications of a single Integrated CCAP by hiding the presence of subtended MAC network elements 330. In this manner, the CMS 300 and the Policy Server 302 are interconnected to the cable aggregator 310 just as they would to an integrated CCAP. The cable aggregator 310 communicates to all subtended MAC network elements (e.g., RMD) 330 by way of a cable aggregator interface 340. The cable aggregator 310 may have a single aggregator interface 340 to each subtended MAC network element 330. See, FMA PacketCable Aggregator Interface Specification CM-SP-FMA-PAI-I01-200930, Sep. 30, 2020, incorporated herein by reference.

Figure 4:
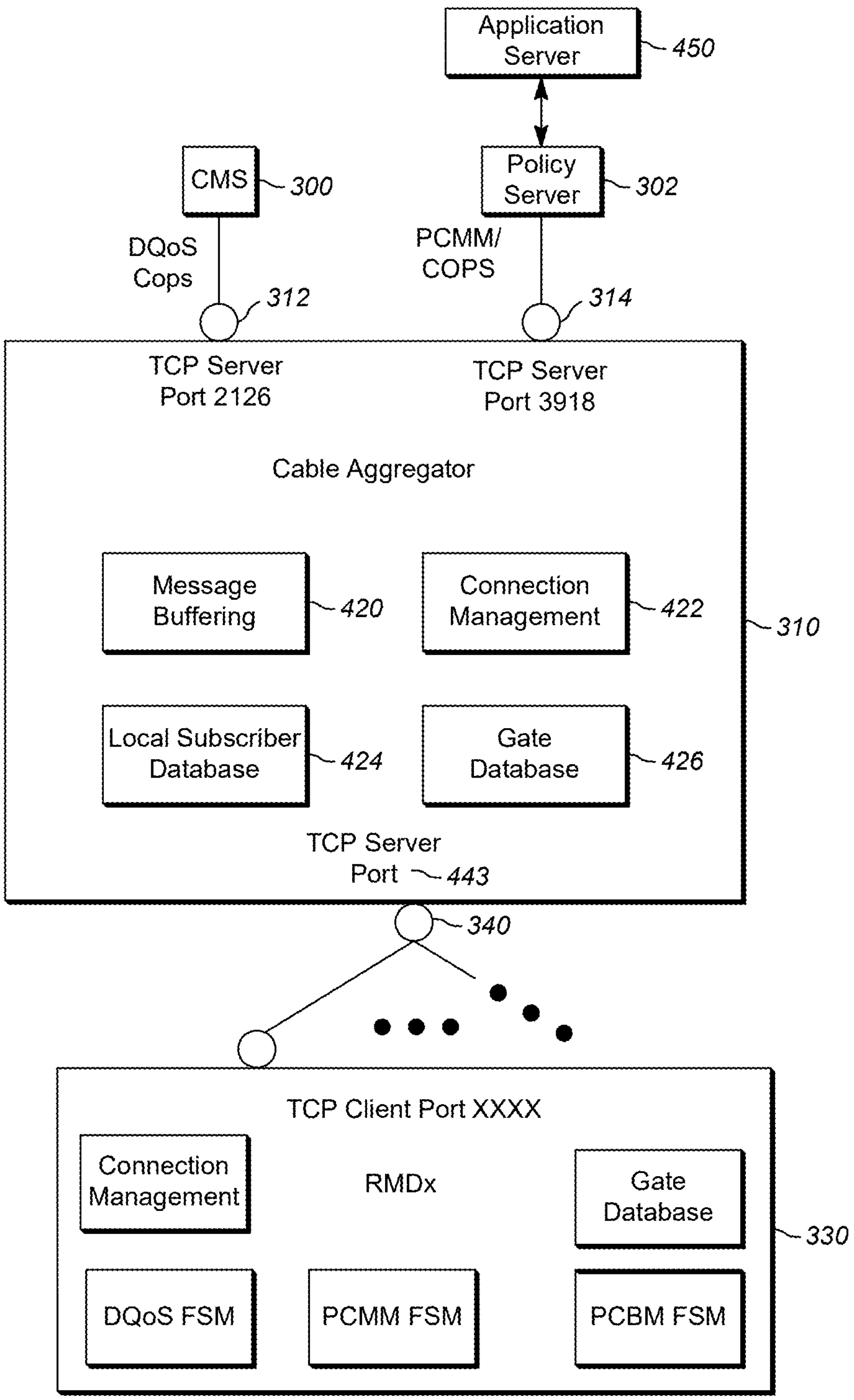
FIG. 4 illustrates a more detailed framework for deploying protocols for a distributed access architecture.

Referring to FIG. 4, additional details are illustrated of the architecture of FIG. 3. The cable interfaces 312 and 314 may use TCP ports for each protocol. The cable aggregator 310 may include various functionality, such as for example, a message buffering 420 for southbound and northbound messages, a connection management 422 for COPS and aggregator interfaces, a local subscriber database 424 for mapping of subscribers to MAC network elements, and a gate database 426 to map COPS gates to and from aggregator interface gates. The southbound of the cable aggregator 310 includes individual aggregator interfaces 340 to each subtended MAC network elements 330, which may incudes remote MACPHY devices (RMDs). The cable aggregator 310 consolidates the transaction-based message sets from its northbound COPS interfaces onto a single transaction based aggregator interface 340 per MAC network element 330.

The cable aggregator 310 appears to be a CMS and policy server from the perspective of the MAC network element. Between each MAC network element 330 and its configured aggregate interface 340, an access interface is established to implement gate-based operations that are requested from the CMS 300 and policy server 302. The cable aggregator 310 translates COPS based requests for each given subscriber device into equivalent access interface messages. An application server 450 may be interconnected to the policy server 302, or otherwise interconnected to the cable aggregator 310.

Figures 5, 6:
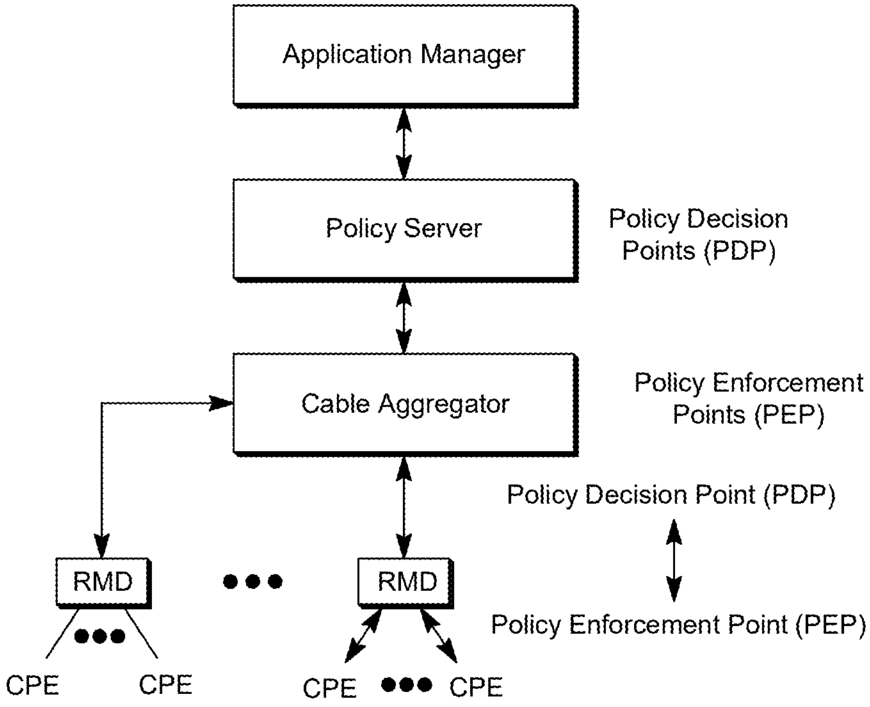
FIG. 5 illustrates an exemplary arrangement of policy decision pints and policy enforcement points.
FIG. 6 illustrates a table of MAC network elements and supported protocol versions.

Referring to FIG. 5, the cable aggregator presents a virtualized cable modem termination system (CMTS) interface to the existing application service devices, such as the call management servers and policy servers. The call management servers and policy servers act as policy decision point (PDP) devices in the common open policy service (COPS) protocol. The MAC network elements 330 act as policy enforcement point (PEP) devices in the common open policy service (COPS) protocol. At the same time, the cable aggregator 310 proxies the PDP interface to each of the MAC network elements 330 for which it has scope. Due to the potential that a system operator may run different versions of the PacketCable specification, multiple PacketCable specifications, and/or other specification(s) the architecture may treat the multiple PacketCable versions (or other specifications) as independent functions which may be independently enabled (or not).

In one embodiment, to a back-office Policy Server, the cable aggregator is an aggregation point for the many RMDs that are managed behind it. However the RMDs behind the cable aggregator may not all be the same software release, device model, or vendor. By way of example, the PacketCable Multimedia protocol allows the Policy Server to negotiate the PCMM Call Control version that is to be used on each COPS connection. The PCMM protocol also allows the policy server to create Call Control COPS connections to multiple RMD devices and negotiate the version used on each COPS connection independently. By way of example, the policy server and/or application server may have two or more COPS links to the cable aggregator. By way of example, the cable aggregator may present multiple host addresses to the policy server and/or application server, preferably with each host addresses associated with a different protocol version.

The cable aggregator may survey the many RMDs that have been configured to determine the protocol versions that they support. The cable aggregator may first try to identify a list of common versions that all of the RMDs will support. For the first connection that the cable aggregator sees from each policy server, the cable aggregator will offer a protocol version from this list (starting at the highest version) to achieve the greatest coverage. If the cable aggregator has additional host IP addresses configured and if the policy server has been configured to use them, the 2nd, 3rd, etc. connection may be set up to use the highest unconnected protocol version that the cable aggregator found in its survey of the RMD population. In this manner, more advanced features typically included in the newer protocol versions may be used. To the back-office policy server, the cable aggregator will appear to be multiple (virtual) CMTS devices, each with a different PCMM Call Control protocol version.

When a policy enforcement point (PEP) (see, RFC2753 A Framework for Policy-based Admission Control, January 2000, incorporated by reference herein) (e.g., Policy Server or CMTS) boots, it listens for incoming COPS connections on an Internet Assigned Numbers Authority (IANA)—assigned TCP port number 3918. The cable aggregator 310 acts as a policy enforcement point (PEP with respect to the policy server 302. Any Application Manager 302 and/or Policy Server (e.g., Policy Decision Point—PDP) with a need to contact a PEP (e.g., cable aggregator 310) initiates a TCP connection to the PEP on that port. One or more Application Managers may establish COPS connections with multiple Policy Servers, and one or more Policy Servers may establish COPS connections with the cable aggregator 310. When the TCP connection between the PEP) (e.g., cable aggregator 310) and the PDP (e.g., policy server 302) is established, the PEP (e.g., cable aggregator 310) sends information about itself to the PDP (e.g., policy server 302) in the form of a Client-Open message. This message includes the Version Info object, which will inform the PDP (e.g., policy server 302) of the currently supported protocol version used on the PEP (e.g., cable aggregator 310).

Upon successful receipt of the Client-Open message, the PDP (e.g., policy server 302) sends a Client-Accept message if the protocol version specified in the Version Info object is supported. This message includes the Keep-Alive-Timer object, which tells the PEP (e.g., cable aggregator 310) the maximum interval between Keep-Alive messages.

If the protocol version supplied by the PEP (e.g., cable aggregator 310) is not supported, the PDP (e.g., policy server 302) sends a Client-Close messages with a COPS Error Object. After sending the Client-Close, the PDP (e.g., policy server 302) retains the TCP connection and security association with the PEP (e.g., cable aggregator 310) so that the PEP (e.g., cable aggregator 310) can reattempt the COPS initialization without reestablishing the TCP connection and security association. After receiving a Client-Close message from the PDP (e.g., policy server 302), which includes a COPS Error Object, the PEP (e.g., cable aggregator 310) may reattempt initialization of the COPS connecting by sending another Client-Open message with another version number in the Version Info Object. This process may continue until the PEP (e.g., cable aggregator 310) has either received a Client-Accept message from the PDP (e.g., policy server 302), or has exhausted all available protocol versions. Once the PEP (e.g., cable aggregator 310) has tried all the protocol versions it supports, the PEP (e.g., cable aggregator 310) sends a Client-Open message with a Major Version Number of 0 and a Minor Version Number of 0 to indicate that it has unsuccessfully completed the version negotiation process. The PDP (e.g., policy server 302) then sends a Client-Close message to the PEP (e.g., cable aggregator 310) to acknowledge that protocol negotiation has failed. On receipt of the Client-Close, the PEP (e.g., cable aggregator 310) closes the TCP connection. At this point, the PDP (e.g., policy server 302) may periodically attempt to re-establish the connection.

In a similar manner, the determination of the various available protocol version for each of the RMD, may be based upon the cable aggregator 310 performing as a policy decision point (PDP) while each of the RMDs performing as a policy enforcement point (PEP). In a similar manner, the cable aggregator may provide an interface to the RMDs that are PCMM/COPS. Accordingly, for communication purposes the cable aggregator appears as a single CMTS to the policy server, and the cable aggregator appears as a policy server to the RMDs.

Referring to FIG. 6, the policy enforcement point (PEP) (e.g., cable aggregator) in each link segment between the policy server and the cable aggregator maintains the list of possible protocol versions supported for that segment. The policy decision point (PDP) (e.g., policy server 302) may only select from the protocol versions that the PEP (e.g., cable aggregator 310) presents. The MAC network elements (RMDs) are configured to support one or more of the protocol versions. The cable aggregator 310, or other device, may determine a list of protocol versions that each of the MAC network elements supports. By way of example, if there are protocol versions 1, 2, 3, 4, 5, 6, and 7, a set of give MAC network elements may support the following exemplary combinations of protocol versions; MAC NE 1 [1, 2, 3, 4, 6, 7]; MAC NE 2 [1, 2, 3, 4, 7]; MAC NE 3 [1, 2, 3, 4,]; MAC NE 4 [1, 2, 3, 4, 5, 7]; MAC NE 5 [1, 2, 3, 4, 5]. As previously described, this determination of protocol versions may be achieved by the PDP (e.g., cable aggregator 310) issuing successive Client-Close messages until the PEP (e.g., RMD 330) stops and sends a protocol version of "0.0" to the PDP (e.g., cable aggregator 310). The PDP (e.g., cable aggregator 310) then sends a final Client Close and the PEP (e.g., RMD 330) closes the TCP connection. With this completed, the cable aggregator 310 has a data table that identifies a set of protocol versions that are supported by each of the MAC network devices 330. It is noted, that the cable aggregator may determine a subset of protocol versions, if desired.

Each of the COPS link is begun by the PDP initiating a TCP connection to the PEP, the PDP controls how many such COPS links are created. Application management devices often create a single COPS connection to a policy server. Application management device may create a COPS link to multiple policy servers. As a result of the application management device potentially creating a COPS link to multiple policy servers, it is desirable for the policy server to present multiple host IP addresses to appear to be multiple policy servers with which the application manager may connect. Once the policy server has accumulated a list of supported protocol versions from each PEP device (e.g., RMD), the policy server may proceed to present supported versions.

Figure 7:
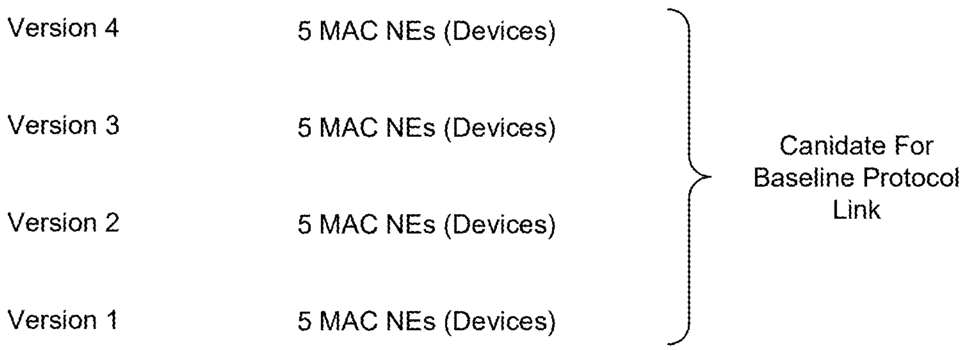
FIG. 7 illustrates candidate for baseline protocol link.

Referring to FIG. 7, the cable aggregator 310 may sort the list of protocol versions supported by the PEPs (e.g., RMDs) according to the number of PEPs (e.g., RMDs) that support each version. If one or more versions are supported by all the PEPs (e.g., RMDs) then these versions (in decreasing order of version number) may be candidate(s) for a baseline protocol link to the PDP (e.g., policy server).

Figure 8:
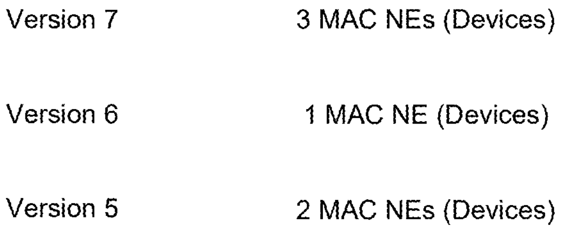
FIG. 8 illustrates remaining protocol link versions.

Referring to FIG. 8, after the baseline protocol list has been created, then the cable aggregator 310 may sort the rest of the versions in decreasing order of version number.

In order to reduce the number of links while increasing the functionality, the PDP (e.g., policy server) may attempt to set up multiple PCMM COPS links to the cable aggregator 310 (using different policy server IP addresses which cause the application manager to believe them to be different policy servers), each with a different protocol version that is to be simultaneously available for use. The first protocol version that the policy server should use is the highest version in the baseline protocol list (e.g., version 4). If the policy server does not accept this, then the policy server would next propose successively lower protocol versions from the baseline protocol list until one is determined that the policy server will accept. Initialization then continues for this COPS link.

If the policy server supports the highest version from the baseline protocol list then it is possible that the policy server supports higher protocol versions than the one selected for the baseline. As the policy server creates additional TCP connections to the cable aggregator 310 host IP addresses, the cable aggregator 310 may present the highest version supported by the RMDs and work its way down the protocol version list.

As the policy server creates additional links, if the cable aggregator 310 detects that all of the policy servers can be connected using PCMM protocol versions that are used in the non-baseline COPS link, then the baseline COPS link can be shut down by the cable aggregator 310 and the cable aggregator 310 can deny further TCP connection attempts.

Once the links to the policy server have been established, the cable aggregator 310 may establish COPS links to each of the policy servers according to the intersection of the set of policy server supported link version and the set of supported version for each RMDs. Further, the number of COPS links provided by the cable aggregator to the policy server and/or application manager is preferably no more than a fixed number of potential such COPS links capable of being provided by the cable aggregator, such as 4.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A cable aggregator for a cable network, comprising:

a processor;

a memory storing instructions that, when executed by the processor, cause the cable aggregator to:

determine a first set of protocol versions that a set of associated remote MACPHY devices support for communication with at least one of a policy server and an application server;

determine a second set of protocol versions that said at least one of said policy server and said application server support for communication with said set of associated remote MACPHY devices; and determine (1) respective one of said first set of protocol versions for said set of associated remote MACPHY devices to be associated with (2) one of said second set of protocol versions for said at least one of said policy server and said application server.

2. The cable aggregator of claim 1 wherein each of said set of associated remote MACPHY devices are subtended to said at least one of said policy server and said application server.

3. The cable aggregator of claim 1 wherein said cable aggregator presents an interface to said at least one of said policy server and said application server as a Cable Modem Termination System (CMTS).

4. The cable aggregator of claim 1 wherein said cable aggregator presents an interface to respective ones of said set of associated remote MACPHY devices as said at least one of said policy server and said application server.

5. The cable aggregator of claim 1 wherein said cable aggregator presents only a single interface to each of said set of associated remote MACPHY devices.

6. The cable aggregator of claim 1 wherein said cable aggregator presents a Common Open Policy Service interface to said at least one of said policy server and said application server.

7. The cable aggregator of claim 1 wherein said cable aggregator presents a plurality of Common Open Policy Service interfaces to one of said policy servers.

8. The cable aggregator of claim 1 wherein said cable aggregator presents a plurality of Common Open Policy Service interfaces to one of said policy servers, where each of said plurality of Common Open Policy Service interfaces is associated with a different protocol version.

9. The cable aggregator of claim 1 wherein said policy server acts as a policy decision point.

10. The cable aggregator of claim 9 wherein said cable aggregator acts as a policy enforcement point with respect to said policy server.

11. The cable aggregator of claim 1 wherein said cable aggregator determines a highest common protocol version for said set of associated remote MACPHY devices.

12. The cable aggregator of claim 11 wherein said cable aggregator determines the highest unconnected protocol version for said set of associated remote MACPHY devices.

13. The cable aggregator of claim 12 wherein said cable aggregator determines the next-highest unconnected protocol version for said set of associated remote MACPHY devices.

* * * * *